United States Patent
Kato (10) Patent No.: US 7,349,134 B2
(45) Date of Patent: Mar. 25, 2008

(54) IMAGE READING APPARATUS

(75) Inventor: Tetsuya Kato, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1035 days.

(21) Appl. No.: 10/603,742

(22) Filed: Jun. 26, 2003

(65) Prior Publication Data

US 2004/0047006 A1   Mar. 11, 2004

(30) Foreign Application Priority Data

Jun. 28, 2002   (JP) ............................. 2002-190107

(51) Int. Cl.
*H04N 1/04* (2006.01)
*H04N 1/46* (2006.01)

(52) U.S. Cl. ............... 358/482; 358/483; 358/513; 358/514; 358/443; 358/445

(58) Field of Classification Search ............... 358/482, 358/483, 486, 446, 497, 505, 506, 487, 512–514, 358/443–445, 450, 474; 250/208.1, 216, 250/234–236; 382/312, 299; 348/294, 298, 348/272, 276, 322, 323, 231.99, 231.2

See application file for complete search history.

(56) References Cited

U.S. PATENT DOCUMENTS

| | | | | |
|---|---|---|---|---|
| 5,767,901 A | * | 6/1998 | Kimura | 348/272 |
| 2004/0008387 A1 | * | 1/2004 | Ikeno | 358/505 |
| 2004/0012829 A1 | * | 1/2004 | Takahashi | 358/474 |
| 2005/0078339 A1 | * | 4/2005 | Hori | 358/445 |

* cited by examiner

*Primary Examiner*—Cheukfan Lee
(74) *Attorney, Agent, or Firm*—Oliff & Berridge, PLC (57) ABSTRACT

An image reading apparatus for reading an image using a monochrome image sensor and a color image sensor having three shift registers which requires a reduced manufacturing cost and is less affected by the influence of external noises. The image reading apparatus comprises an analog frontend IC with three channels and having programmable gain amplifiers (PGA) for the respective channels capable of adjusting gains, an analog/digital converter (ADC) and a multiplexer (MUX) for sequentially providing signals amplified by the respective PGAs to the analog/digital converter built-in. The image reading apparatus amplifies pixel signals output from the respective channels of the monochrome image sensor or the color image sensor by providing the pixel signals to the corresponding PGAs, and converts the amplified pixel signals into pixel data through the analog/digital converter.

10 Claims, 9 Drawing Sheets

IMAGE READING APPARATUS

BACKGROUND OF THE INVENTION (1) Field of the Invention

The present invention relates to an image reading apparatus using a monochrome image sensor.

(2) Background Art

Conventionally, there are known examples of image reading apparatuses such as an image reading apparatus that reads an image from an original copy using a monochrome image sensor and then generates monochrome image data. Also, there is an image reading apparatus that reads an image from an original copy using a color image sensor and then generates color image data. These image reading apparatuses are incorporated, for example, in copying machines, fax machines and scanners.

Some image reading apparatuses switch allowing a choice between either a low resolution mode or a high resolution mode for outputting image data in low or high resolution, respectively, and make one of the modes operate according to a command signal input from an operating portion of a user interface.

An example of such conventional apparatuses having a plurality of modes is an apparatus that obtains image data in high resolution from an image sensor and generates image data in low resolution by skipping pixel data constituting the image data in high resolution.

Another example is an image reading apparatus which comprises an image sensor including a sensor having a plurality of light receiving elements in a primary scanning direction, a shift register for outputting the respective light reception signals obtained from the light receiving elements arranged at even-numbered positions among the light receiving elements constituting the sensor, and another shift register for outputting the respective light reception signals obtained from the light receiving elements arranged at odd-numbered positions, which generates, in the high resolution mode, image data in high resolution by using output signals from both of the shift registers, and generates, in the low resolution mode, image data in low resolution (specifically, half of the resolution in the high resolution mode) by using output signals from one of the shift registers.

However, a conventional image reading apparatus of the former example which lowers the resolution by skipping image data involves a problem that the image reading speed of the image sensor is not improved even in the low resolution mode so that an advantage by lowering the resolution cannot be fully obtained.

A conventional image reading apparatus of the latter example provided with two shift registers also involves a problem that the needs of users who demand a wide variety of selectable resolutions cannot be fully satisfied since the selectable resolutions are only two, although the processing speed can be effectively improved in the low resolution mode.

The inventors of the present invention devised an image reading apparatus by providing a conventional image reading apparatus of the latter example with an additional sensor disposed at a predetermined distance away from the above-mentioned sensor in a secondary scanning direction and having a plurality of light receiving elements whose light receiving positions are arranged between the respective light receiving elements of the above-mentioned sensor, and an additional shift register for outputting the respective signals obtained from the light receiving elements constituting the additional sensor.

Such an image reading apparatus is advantageous since the resolution can be switched among three selectable resolutions by combining two sensors and three shift registers and the image processing speed may be improved depending on the resolution.

For example, when each sensor is set to be able to read with a resolution of 600 dpi in the primary scanning direction, the image reading apparatus as above can generate image data with a resolution of 1200 dpi by using all the signals obtained from the three shift registers, generate image data with a resolution of 600 dpi by using the signals obtained from the additional shift register and generate image data with a resolution of 300 dpi by using the signals obtained from the shift register for outputting the respective light reception signals of the light receiving elements arranged at even-numbered (or odd-numbered) positions.

In the image reading apparatus as above, however, circuits required for finishing conversion of analog light reception signals obtained from the shift registers into pixel data as digital signals are increased and limitation to the installation location of the circuits is imposed. As a result, the length of the wiring in the circuits is increased, which makes the image reading apparatus susceptible to the influence of external noises.

An object of the present invention, which has been made to solve these problems, is to provide an image reading apparatus that reads an image by using a monochrome image sensor having three shift registers, which requires a reduced manufacturing cost and is less susceptible to external noises.

SUMMARY OF THE INVENTION

The above and other objects are attained by an image reading apparatus that reads an image using a monochrome image sensor including a first sensor having a plurality of light receiving elements arranged in a primary scanning direction, a second sensor having a plurality of light receiving elements which are arranged in the primary scanning direction and at a predetermined distance away from the first sensor in a secondary scanning direction and whose light receiving positions are arranged between the respective light receiving elements constituting the first sensor, a first shift register for outputting the respective light reception signals obtained from the respective light receiving elements constituting the first sensor according to the order of arrangement of the corresponding light receiving elements, a second shift register for outputting the respective light reception signals obtained from the respective light receiving elements arranged at even-numbered positions among the light receiving elements constituting the second sensor, and a third shift register for outputting the respective light reception signals obtained from the respective light receiving element arranged at odd-numbered positions among the light receiving elements constituting the second sensor according to the order of arrangement of the corresponding light receiving elements.

The image reading apparatus comprises an analog frontend IC having at least three channels and provided internally with analog amplifiers for the respective channels capable of adjusting the gains with respect to analog input signals, an analog/digital converter for converting the analog input signals into digital signals and outputting the digital signals, and a multiplexer for sequentially providing the analog input signals amplified by the respective analog amplifiers to the analog/digital converter. The respective light reception signals output from the first, the second and the third shift registers, respectively, are provided as the analog input signals to the analog amplifiers for the channels corresponding to the respective shift registers.

In a typical image reading apparatus, analog light reception signals output from shift registers must be converted into digital signals for image processing. Therefore, as the number of shift registers is increased, the number of analog/digital converters needs to be increased, which results in complicated circuits and an increased manufacturing cost of the image reading apparatus.

In contrast, according to the image reading apparatus of the present invention, the respective light reception signals output from the monochrome image sensor are converted into pixel data through the analog frontend IC, and thus the circuits required for converting the analog light reception signals into digital signals may be simplified. As a result, the image reading apparatus of the present invention will prevent a cost increase as well as achieve downsizing due to an increase of options for installation locations of the circuits.

Also, according to the image reading apparatus of the present invention, the length of the wiring in the circuits may be reduced by using the analog frontend IC, which makes the image reading apparatus more resistant to external noises. That is, the influence of external noises affecting the apparatus may be reduced.

The analog frontend IC above may be provided internally with offset adding circuits for respective channels which add offset voltages to analog input signals.

When the image reading apparatus is provided with an analog frontend IC having offset adding circuits built-in, and the respective light reception signals output from the respective first, second and third registers are provided to the offset adding circuits for the respective channels corresponding to the respective shift registers and the analog input signals with offset voltages added to be output from the offset adding circuits are provided to the analog amplifiers, the circuit configuration in the image reading apparatus may be farther simplified, which will prevent a cost increase of the image reading apparatus and reduce the adverse influence of external noises on the apparatus.

In another aspect of the invention, the image reading apparatus further comprises a color image sensor capable of reading color images that outputs light reception signals in red, green and blue in addition to the monochrome image sensor, without a separate analog frontend IC corresponding to the color image sensor provided in addition to the above-mentioned analog frontend IC. In this case, during the operation of the color image sensor, the light reception signals in the respective colors output from the color image sensor, instead of the respective light reception signals output from the monochrome image sensor, are provided as the analog input signals to the analog amplifiers for the channels corresponding to the respective colors in the analog frontend IC.

According to the image reading apparatus, wherein a single common analog frontend IC is provided for the color image sensor and the monochrome image sensor, the circuit configuration in the image reading apparatus may be simplified and the length of the wiring may be reduced. Therefore, the resistance of the image reading apparatus to external noises will be improved. Furthermore, the number of components is reduced so that the manufacturing cost of the image reading apparatus may be reduced.

When a single common analog frontend IC is shared by the color image sensor and the monochrome image sensor, the light reception signals output from the color image sensor and the monochrome image sensor, respectively, may be unable to be amplified optimally by the analog amplifiers.

In yet another aspect of the invention, therefore, the image reading apparatus is provided with a gain changing device to perform gain adjustment of the analog amplifiers during the respective operations of the monochrome image sensor and the color image sensor.

According to the image reading apparatus provided with the gain changing device, during the operations of the respective image sensors, gains appropriate for the outputs of the respective image sensors can be set at the analog amplifiers. Thus, the light reception signals output from the respective image sensors can be amplified appropriately by the analog amplifiers, which will improve the accuracy of image reading.

When the image reading apparatus comprises the analog frontend IC provided internally with offset adding circuits, it is advantageous to provide an offset changing device for adjusting offset voltages to be added in the offset adding circuits during the respective operations of the monochrome image sensor and the color image sensor. By providing the offset changing device, the light reception signals output from the respective image sensors can be amplified appropriately by the analog amplifiers, which will improve the accuracy of image reading.

In a further aspect of the invention, the gain changing device in the image reading apparatus operates as described below in view of the little advantage of adjusting the respective gains at the analog amplifiers of the respective channels during the operation of the monochrome image sensor.

Specifically, during the operation of the monochrome image sensor, once the gain changing device performs gain adjustment to one of the analog amplifiers, the gain changing device sets the same gain at the other analog amplifiers. Thus, the gain adjustment during the operation of the monochrome image sensor can be performed rapidly.

In yet another aspect of the invention, the image reading apparatus comprises a gain changing device to set the gains of the respective analog amplifiers to predetermined gains for monochrome reading during the operation of the monochrome image sensor, and to set the gains of the respective analog amplifiers to predetermined gains for color reading during the operation of the color image sensor.

According to the image reading apparatus constituted as above, appropriate gain setting can be performed with respect to the monochrome image sensor and the color image sensor, respectively, since the gains for monochrome reading and the gains for color reading are predetermined. Moreover, the gains can be changed more rapidly than in the case of performing gain adjustment every time an image is read.

In a further aspect of the invention, the gain changing device in the image reading apparatus operates as described below in view of the little advantage of adjusting the respective gains at the analog amplifiers for the respective channels during the operation of the monochrome image sensor.

Specifically, during the operation of the monochrome image sensor, the gain changing device sets all the gains of the analog amplifiers to a predetermined common gain as the gains for monochrome reading during the operation of the monochrome image sensor. Thus, the gain setting for the monochrome reading can be performed rapidly.

When the analog frontend IC is provided internally with the offset adding circuits for the respective channels, an offset changing device may be provided to set the offset voltages to be added by the respective offset adding circuits during the operation of the monochrome image sensor to predetermined offset voltages for monochrome reading, and to set the offset voltages to be added by the respective offset adding circuits during the operation of the color image sensor to predetermined offset voltages for color reading. Thus, the accuracy of image reading may be improved.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
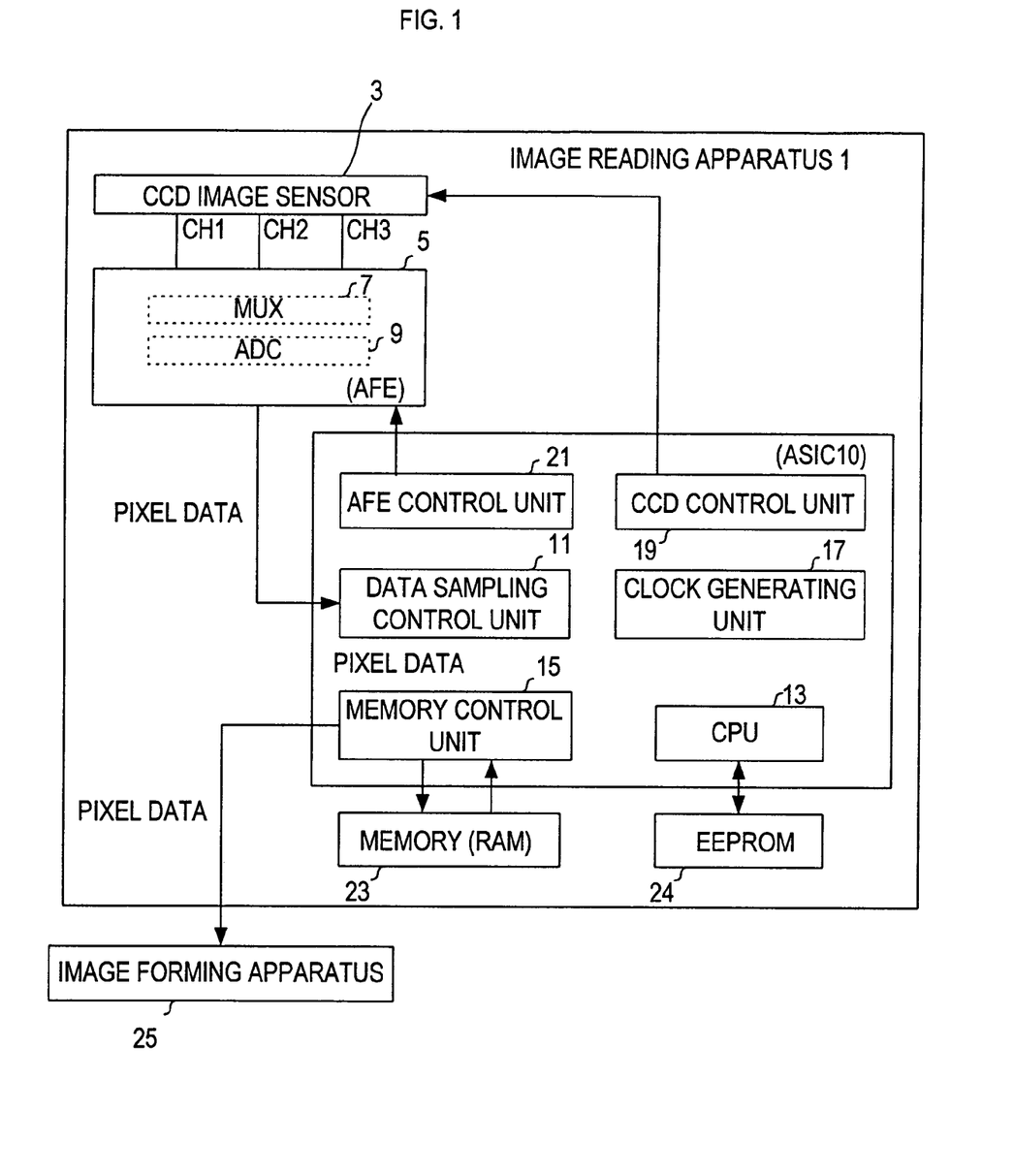
FIG. 1 is a schematic block diagram showing the configuration of an image reading apparatus according to the present embodiment.

FIG. 1 is a block diagram showing the internal configuration of an image reading apparatus 1 to which the present invention is applied.

As shown in FIG. 1, the image reading apparatus 1 according to the present embodiment is provided with a CCD (Charge Coupled Device) image sensor 3 and an analog frontend (AFE) IC 5, and reads an image from the original copy using the CCD image sensor 3 and provides pixel signals output from respective channels (CH1, CH2, CH3) of the CCD image sensor 3 during the image reading to the analog frontend IC 5.

The image reading apparatus 1 sequentially provides the pixel signals of the respective channels obtained from the COD image sensor 3 to an analog/digital converter (ADC) 9 using a multiplexer (MUX) 7 in the analog frontend IC 5 to sequentially convert the pixel signals of the respective channels into pixel data as digital signals, and then provideds the pixel data from the analog frontend IC 5 into a data sampling control unit 11 in an ASIC 10 as a serial data stream.

In the ASIC 10, a CPU 13 for comprehensively controlling the image reading apparatus 1, a memory control unit 15, a clock generating unit 17, a CCD control unit 19 and an AFE control unit 21 are built-in in addition to the data sampling control unit 11. A memory 23 (i.e. a RAM) for storing pixel data and an EEPROM 24 for storing a variety of setting information about the image reading apparatus 1 are provided outside the ASIC 10.

The data sampling control unit 11 deletes pixel data unnecessary to be stored in the memory 23 from among the pixel data which is output from the analog frontend IC 5, and provides the remaining pixel data to the memory control unit 15.

The memory control unit 15 designed to control writing of pixel data and reading of pixel data sequentially writes the pixel data provided from the data sampling control unit 11 into a predetermined area of the memory 28, and reads out the pixel data stored in the memory 23 according to a command by the CPU 13 and outputs the read-out data to an external image forming apparatus 25.

The clock generating unit 17 generates clock signals to make the respective portions in the CCD image sensor 3, the analog frontend IC 5 and the ASIC 10 operate synchronously The CCD control unit 19 is designed to switch the operation mode of the CCD image sensor 3, and controls the driving of the CCD image sensor 3 according to the clock signals obtained from the clock generating unit 17.

Figure 2:
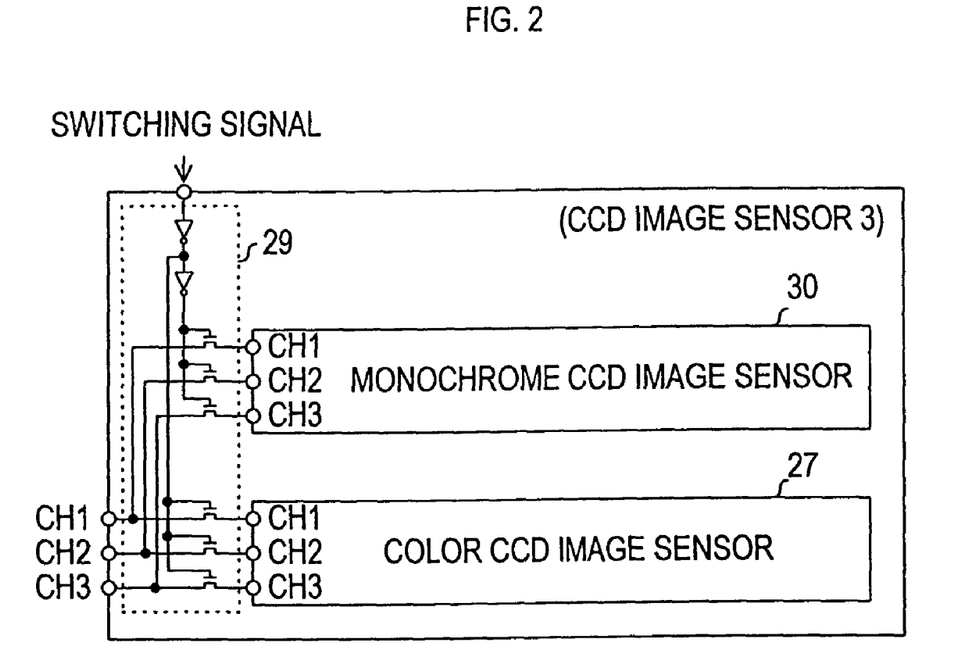
FIG. 2 is an explanatory view showing the schematic configuration of a CCD image sensor.

FIG. 2 is an explanatory view showing the internal configuration of the CCD image sensor 3. The CCD image sensor 3 of the present embodiment has a color CCD image sensor 27 and a monochrome CCD image sensor 30 built-in. The CCD image sensor 3, which also has a switching circuit 29 including an FET and a NOT circuit, switches the ON/OFF of the FET constituting the switching circuit 29 according to a switching signal from the CCD control unit 19 and provides pixel signals output from the respective channels (CH1, CH2, CH3) of the color CCD image sensor 27 or the monochrome CCD image sensor 30 to the analog frontend IC 5.

The color CCD image sensor 27 capable of reading color image like a known color CCD image sensor outputs respective pixel signals of red (R), green (G) and blue (B) from the corresponding channels (CH1, CH2, CH3) and provides them to the analog frontend IC 5. For example, the pixel signal of red is output from the first channel (CH1), the pixel signal of green is output from the second channel (CH2) and the pixel signal of blue is output from the third channel (CH3), and each of the pixel signals is provided to the corresponding channel of the analog frontend IC 5.

Figure 3:
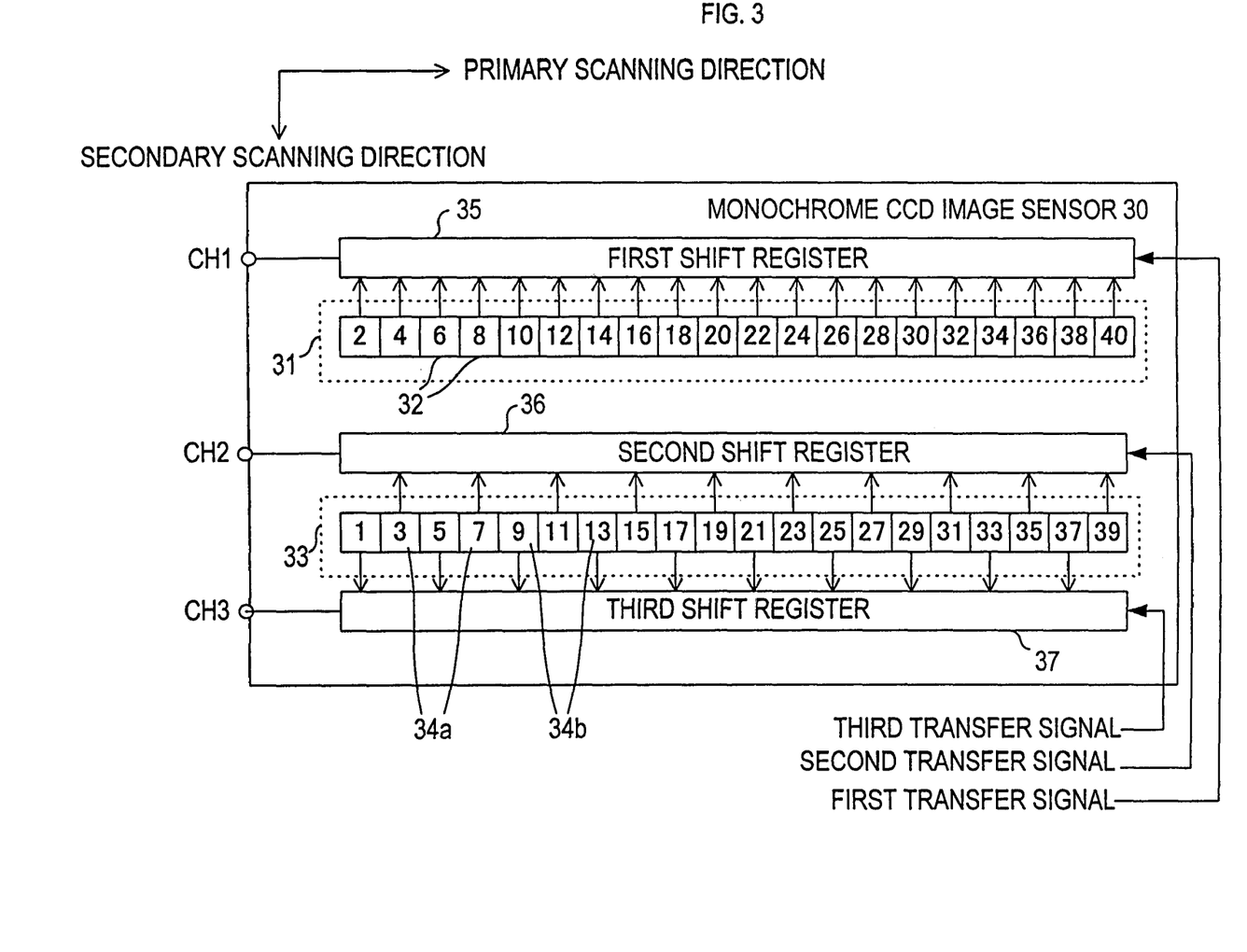
FIG. 3 is an explanatory view showing the schematic configuration of a monochrome CCD image sensor.

The monochrome CCD image sensor 30 is configured as shown in FIG. 3. The monochrome CCD image sensor 30 is provided with a first sensor 31, a second sensor 33, a first shift register 35, a second shift register 36 and a third shift register 37. The first sensor 31 has a plurality of light receiving elements 32 (i.e. photo diodes) arranged in a primary scanning direction. The second sensor 33 has a plurality of light receiving elements 34a, 34b (i.e. photo diodes) arranged in the primary scanning direction, and is disposed in parallel with and at a predetermined distance away from the first sensor 31 in a secondary scanning direction.

The respective light receiving elements 34a, 34b constituting the second sensor 33 have respective light receiving positions that are set to be at a predetermined distance (e.g. 6 lines) away from the first sensor 31 in the secondary scanning direction and to be shifted by a half pixel with respect to the respective light receiving elements 32 constituting the first sensor 31. In other words, by the arrangement of the first sensor 31 and the second sensor 33 as above, the light receiving elements 32 and the light receiving elements 34a, 34b in the monochrome CCD image sensor 30 are mutually shifted by a half pixel to give a so-called zigzag arrangement. Due to such an arrangement, the resolution in the primary scanning direction can be artificially improved by writing the pixel signals into the memory 23 according to the order of the respective pixel numbers shown in FIG. 3.

The first shift register 35 obtains the respective pixel signals output from the respective light receiving elements 32 constituting the first sensor 31 as the result of receiving light through a not shown shift gate, and outputs the respective pixel signals according to the order of arrangement of the corresponding light receiving elements 32.

The second shift register 36 obtains pixel signals from the respective light receiving elements 34a arranged at even-numbered positions among the light receiving elements 34a, 34b constituting the second sensor 33 through a not shown shift gate, and outputs the respective pixel signals according to the order of arrangement of the corresponding light receiving elements 34a.

The third shift register 37 obtains pixel signals from the respective light receiving elements 34b arranged at odd-numbered positions among the light receiving elements 34a, 84b constituting the second sensor 33 through a not shown shift gate, and outputs the respective pixel signals according to the order of arrangement of the corresponding light receiving elements 34b.

In the monochrome CCD image sensor 30, the pixel signals corresponding to the even-numbered pixels in the primary direction are output from the first channel (CH1) connected to the first shift register 35, the pixel signals corresponding to the pixels in the (4m−1)th positions (m: natural number of 1 or more) in the primary direction are output from the second channel (CH2) connected to the second shift register 36, and the pixel signals corresponding to the pixels in the (4m−3)th positions (m: natural number of 1 or more) in the primary direction are output from the third channel (CH3) connected to the third shift register 37.

At the respective output ends of the shift registers 35, 36, 37, known conversion circuits for converting signal charges output by the shift registers 35, 36, 37 as pixel signals into analog voltages.

Figure 4:
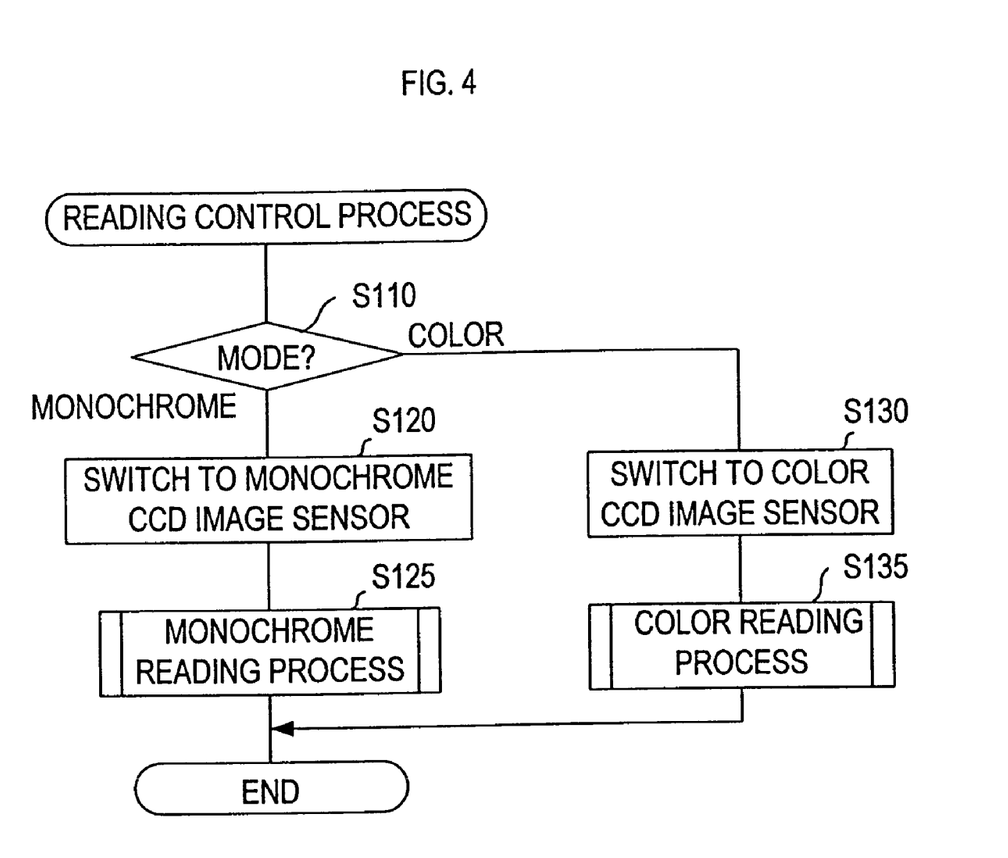
FIG. 4 is a flowchart showing the reading control process executed by a CPU through a CCD control unit.

FIG. 4 is a flowchart showing the reading control process executed by the CPU 13 through the CCD control unit 19 which controls the driving of the CCD image sensor 3. When a reading control signal is provided from the CPU 13, the CCD control unit 19 executes the reading control process according to the control signal to operate the CCD image sensor 3 as described below and thereby read an image from the original copy.

When a read command signal is input from a not shown operation panel or an external device, the CPU 1a first determines whether the present image reading mode is a monochrome reading mode or a color reading mode based on mode selection information transmitted with the read command signal (S110).

When it is determined that the present image reading mode is a monochrome reading mode, the CPU 13 provides a switching signal to the CCD image sensor 3 through the CCD control unit 19 to make the pixel signals of the respective channels output from the monochrome CCD image sensor 30 be provided to the respective channels of the analog frontend IC 5 (S120). Then, the CPU 13 controls and makes operate the monochrome CCD image sensor 30 to execute monochrome reading process (S125).

Specifically, the CCD control unit 19 provides a transfer signal for making operate the shift registers 35 to 37 to the monochrome CCD image sensor 30 to control the transfer operation of the shift registers 35 to 37 and thereby to perform reading of an image in the primary direction. Also, the CPU 13 relatively moves the original copy or the CCD image sensor 3 in the secondary scanning direction through a motor control unit for making operate a not shown original copy transfer mechanism or a reading unit to perform reading of the image in two-dimensional manner.

When it is determined that the present image reading mode is a color reading mode, the CPU 13 provides a switching signal to the CCD image sensor 3 to make the pixel signals of the respective channels output from the color CCD image sensor 27 (i.e. pixel signals of the respective colors) be provided to the respective channels of the analog frontend IC 5 through the CCD control unit 19 (S130).

Then, the CPU 13 makes operate the color CCD image sensor 27 to execute color reading process (S15) through the CCD control unit 19 to perform reading of a color image from the original copy. Since the scanning method of the CCD image sensor is well known, no detailed description of the scanning method will be provided herein.

Figure 5:
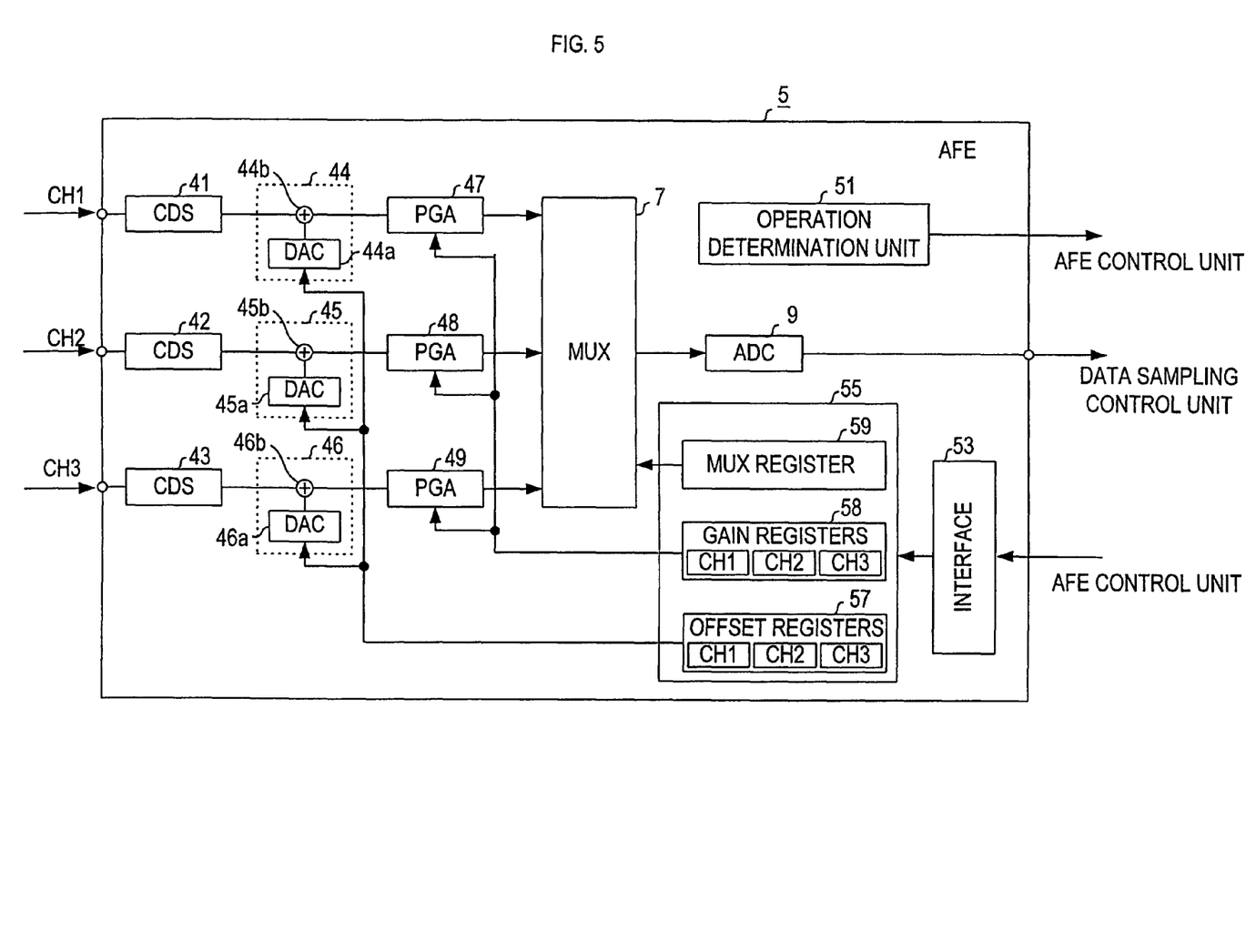
FIG. 5 is a schematic block diagram showing the internal configuration of an analog frontend IC.

When the image is read and the pixel signals are output from the respective channels of the CCD image sensor 3 under the control of the CCD control unit 19, the analog frontend IC 5 processes the pixel signals in itself specifically as described below. FIG. 5 schematically shows the internal configuration of the analog frontend IC 5.

The analog frontend IC 5 is provided mainly with correlated double sampling circuits (CDS) 41 to 43, offset adjustment circuits 44 to 46, programmable gain amplifiers (PGA) 47 to 49, the above-mentioned multiplexer (MUX) 7, the above-mentioned analog/digital converter (ADC) 9, an ADC operation determination unit 51, an interface 53 and a register unit 55. The analog frontend IC 5 has three channels, and the correlated double sampling circuits 41 to 43, the offset adjustment circuits 44 to 46 and the programmable gain amplifiers 47 to 49 are provided for the respective channels.

The correlated double sampling circuits 41 to 43, which are provided for eliminating components or the like that could be a source of noise or error from the pixel signals obtained from the CCD image sensor 3, are connected to the input ends of the respective channels (CH1, CH2, CH3). As is commonly known, the correlated double sampling circuits 41 to 43 eliminate an error voltage caused by the charge when the clock of the shift register is switched from L (low) signal to H (high) signal, by sampling the pixel signals output from the CCD image sensor 3 twice at a certain time interval. After the elimination above, the pixel signals are provided to the offset adjustment circuits 44 to 46.

The offset adjustment circuits 44 to 46 including digital/analog converters (DAC) 44a, 45a, 46a and adders 44b, 45b, 46b, respectively, add offset voltages to the input signals of the respective channels (CH1, CH2, CH3). Offset registers 57 provided in the register unit 55 store set offset values for the respective channels which indicate the offset voltages added by the offset adjustment circuits 44 to 46. The offset adjustment circuits 44 to 46 of the respective channels add the offset voltages corresponding respectively to the set offset values stored in the offset registers 57 to the pixel signals transmitted from the correlated double sampling circuits 41 to 43, and provide the pixel signals with the offset voltages added to the programmable gain amplifiers 47 to 49 of the corresponding channels.

The programmable gain amplifiers 47 to 49, which are known analog amplifiers capable of adjusting the gain with respect to an input signal, are provided downstream from the respective offset adjustment circuits 44 to 46. Gain registers 58 provided in the register unit 55 store set gain values for the respective channels which indicate the gains to be set at the respective programmable gain amplifiers 47 to 40. The respective programmable gain amplifiers 47 to 49 of the respective channels amplify the pixel signals of the corresponding channels provided from the CCD image sensor 3 through the offset adjustment circuits 44 to 46 by the gains in accordance with the respective set gain values stored in the gain registers 58, and provide the amplified pixel signals to the multiplexer 7. The programmable gain amplifiers are hereinafter referred to simply as the "amplifiers."

The multiplexer 7 has three input channels and one output channel. The respective input channels are connected to the output ends of the corresponding amplifiers 47 to 49, and the output channel is connected to the analog/digital converter 9. The multiplexer 7, which is designed to select one of the input signals from the three amplifiers 47 to 49 depending on the set value of a register 59, sequentially provides the pixel signals amplified by the respective amplifiers 47 to 49 to the analog/digital converter 9.

The analog/digital converter 9 converts the analog pixel signals output from the multiplexer 7 into digital signals (pixel data) and outputs the digital signals. The output end of the analog/digital converter 9 is connected to the data sampling control unit 11.

The ADC operation determination unit 51 is for monitoring whether or not the output signals from the analog/digital converter 9 are appropriate by the AFE control unit 21. The ADC operation determination unit 51 provides a signal indicating the state of the output of the analog/digital converter 9 to the AFE control unit 21. The interface 58 is for writing a variety of data from an external device such as the AFE control unit 21 into the register unit 55.

Figure 6:
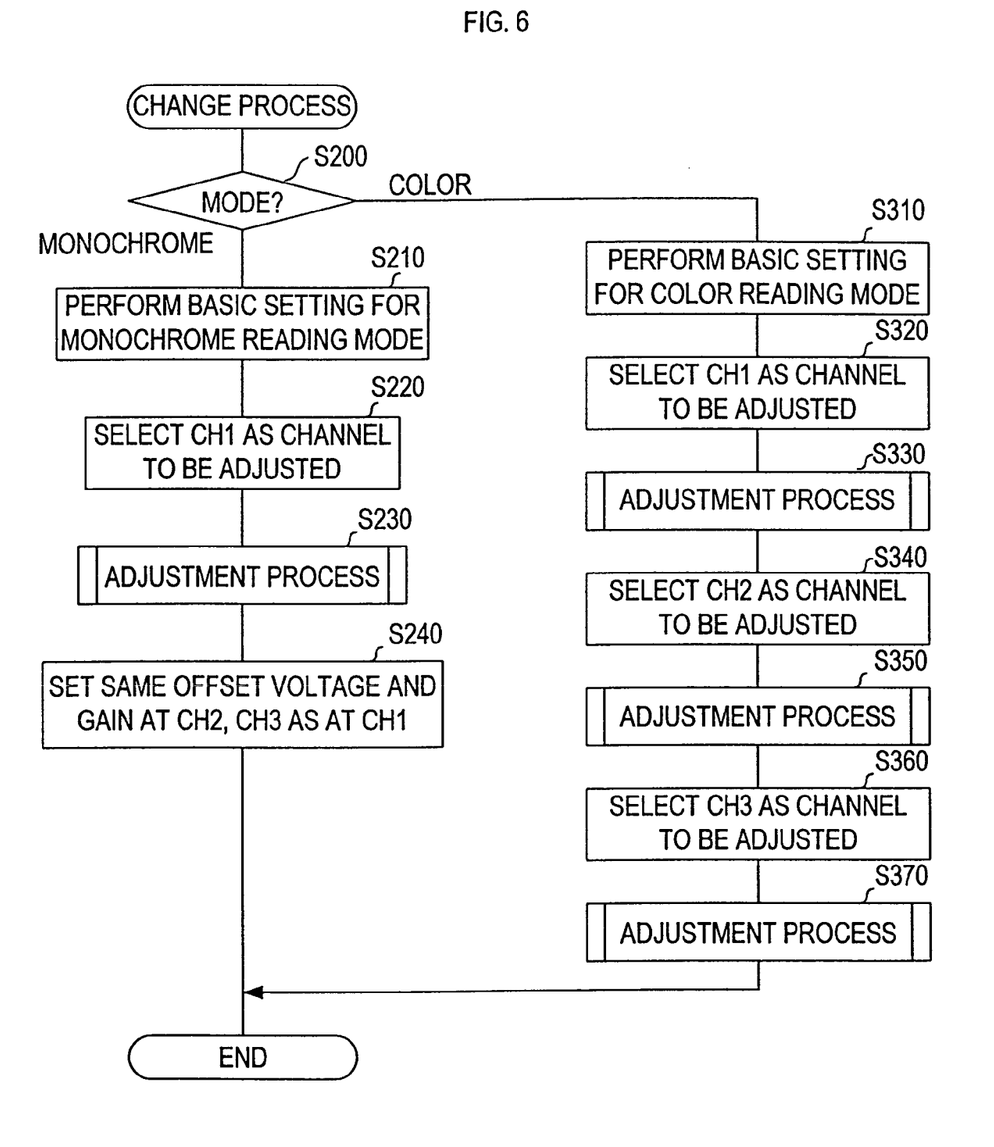
FIG. 6 is a flowchart showing the change process executed by the CPU through an AFE control unit.

The process executed through the AFE control unit will now be described with reference to FIG. 6, which is a flowchart showing the change process executed under the control of the CPU 13 through the AFE control unit 21.

The AFE control unit 21 is for establishing various setting on the analog frontend IC 5 to perform offset adjustment and gain adjustment. When receiving a read command signal, the CPU 13 executes the change process shown in FIG. 6 through the AFE control unit 21.

When the process is started, the CPU 13 first determines in S200 whether the present image reading mode is the monochrome reading mode or the color reading mode according to the mode selection information transmitted with the read command signal.

When it is determined that it is the monochrome reading mode, basic setting for the monochrome reading mode is performed in S210. Specifically, the CPU 18 performs initial setting of the analog frontend IC 5 required to make the respective portions of the analog frontend IC 5 operate appropriately in accordance with the patterns of the pixel signals output from the monochrome CCD image sensor 30, including the operation patterns of the multiplexer 7, through the AFE control unit 21.

Then, the CPU 13 selects the fist channel (CH1) as the channel to be adjusted (S220), executes adjustment process (S230), i.e. performs offset adjustment and gain adjustment with respect to the first channel (CH1).

Figure 7:
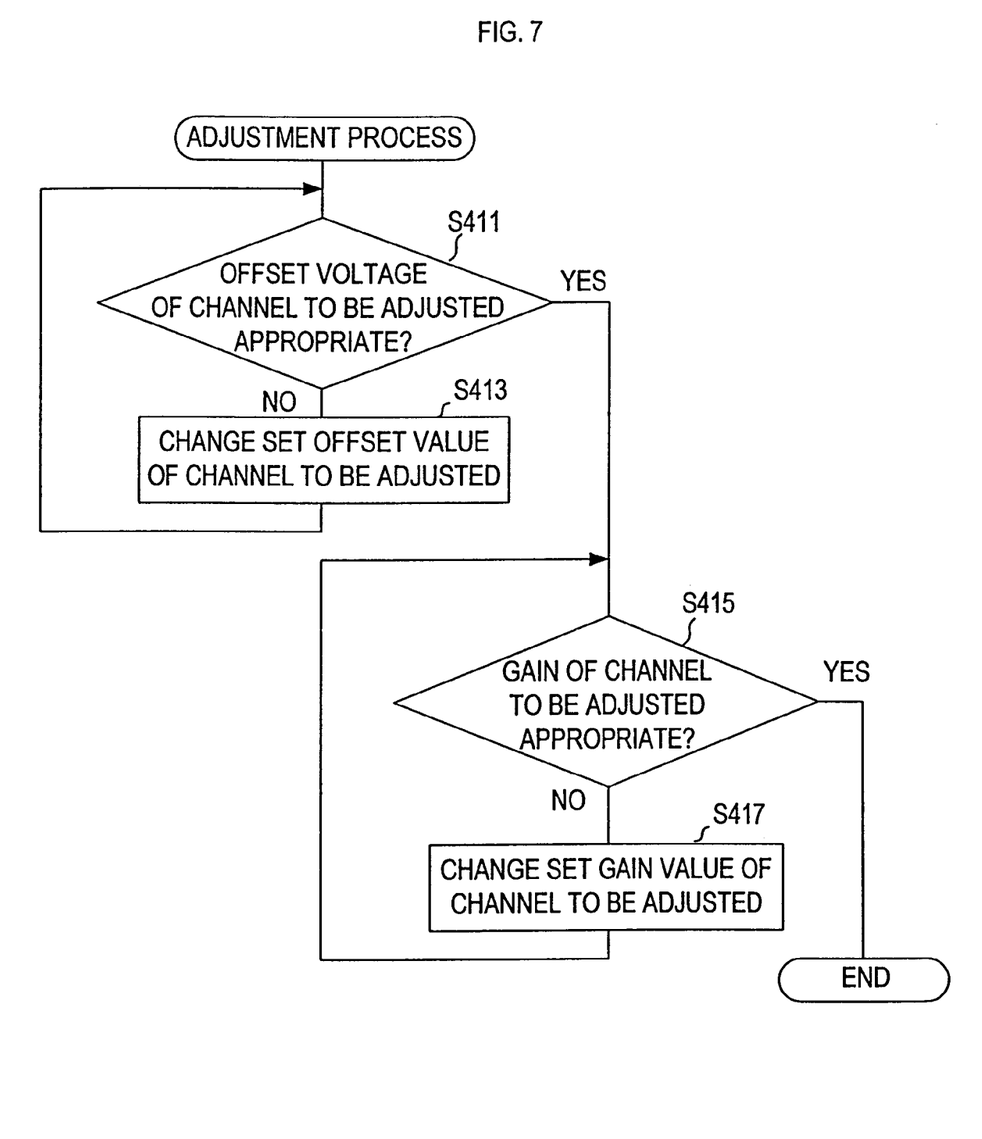
FIG. 7 is a flowchart showing the adjustment process executed by the CPU through the AFE control unit.

FIG. 7 is a flowchart showing the adjustment process executed under the control of CPU 13 through the AFE control unit 21. When the adjustment process is started, the CPU 13 determines through the AFE control unit 21 whether or not the offset voltage set at the offset adjustment circuit 44 of the first channel (CH1) is appropriate by using a test signal transmitted from the monochrome CCD image sensor 30 (S411).

Specifically, the CPU 13 determines through the AFE control unit 21 whether or not the output from the analog/digital converter 9 in accordance with the test signal is a negative value, based on the output signal from the ADC operation determination unit 51.

When the output is a negative value, the CPU 13 determines that the offset voltage is not appropriate ("No" in S411), changes the set offset value of the first channel (CH1) stored in the offset register (S413), and then determines again whether or not the output from the analog/digital converter 9 is a negative value in S411. If the output is not a negative value (i.e. the output is a positive value), the CPU 13 determines that the offset voltage is appropriate ("Yes" in S411).

When it is determined "Yes" in S411, the process proceeds to S415, and the CPU 13 determines whether or not the gain set at the amplifier 47 of the first channel (CH1) is appropriate by using a test signal transmitted from the monochrome CCD image sensor 30.

Specifically, the CPU 13 determines through the AFE control unit 21 whether or not the output from the analog/digital converter 9 in accordance with the test signal is lower by a certain extent than the maximum output of the analog/digital converter 9, based on the output signal from the ADC operation determination unit 51. If the output is not lower by a certain extent, the CPU 13 determines that the gain is not appropriate ("No" in S415), and changes the set gain value of the first channels (CH1) stored in the gain register 58 in S417.

Then, the process proceeds again to S415 and the CPU 13 performs the same determination. If the output from the analog/digital converter 9 is lower by a certain extent than the maximum output of the analog/digital converter 9, it is determined that the gain set at the first channel (CH1) is appropriate ("Yes" in S415), and the present adjustment process is terminated.

Subsequently, the CPU 13 changes the set offset values and the set gain values of the second channel (CH2) and the third channel (CH3) in the offset registers 57 and the gain registers 58 to be the same values as the set offset value and the set gain value of the first channel (CH1) through the AFE control unit 21 (S240). By this, the same offset voltage and the gain as the offset voltage and the gain set at the offset adjustment circuit 44 and the amplifier 47 of the first channel (CH1) are set at the offset adjustment circuits 45, 46 and the amplifiers 48, 49 of the second channel (CH2) and the third channel (CH3), and the present change process is terminated.

On the other hand, when it is determined in S200 that the present reading mode is the color reading mode, the CPU 13 performs basic setting for the color reading mode in S310. Specifically, the CPU performs initial setting of the analog frontend IC 5 required to make the respective portions of the analog frontend IC 5 operate appropriately in accordance with the pattern of the pixel signals output from the color CCD image sensor 27, including the operation pattern of the multiplexer 7, through the AFE control unit 21.

Then, the CPU 13 selects the first channel (CH1) as the channel to be adjusted (S320) and executes the above described adjustment process (S380), i.e. performs processing from S411 through S417 as above so as to adjust the offset voltage and the gain with respect to the first channel (CH1) to be appropriate through the AFE control unit 21.

Once adjustment of the offset voltage and the gain with respect to the first channel (CH1) has been completed, the process proceeds and the CPU 18 selects the second channel (CH2) as the channel to be adjusted in 340 and executes the adjustment process in S350.

When the adjustment process is started, the CPU 13 determines through the AFE control unit 21 whether or not the offset voltage set at the offset adjustment circuit 46 of the second channel (CH2) is appropriate by using the above-mentioned test signal (S411).

When the CPU 13 determines that the offset voltage is not appropriate ("No" in S411), it changes the set offset value of the second channel (CH2) stored in the offset register 57, and then determines again whether or not the offset voltage is appropriate in S411.

When the CPU 13 determines that the offset voltage is appropriate ("Yes" in S411), the process proceeds to S415, in which the CPU 13 determines through the AFE control unit 21 whether or not the gain set at the amplifier 48 of the second channel (CH2) is appropriate by using the above-mentioned test signal.

If it is determined that the gain is not appropriate ("No" in S415), the AFE control unit 21 changes the set gain value of the second channel (CH2) stored in the gain register 58 in S417, and again determines whether or not the gain is appropriate. When it is determined that the gain is appropriate ("Yes" in S415), the present adjustment process is terminated.

Once adjustment of the offset voltage and the gain with respect to the second channel (CH2) has been completed, the process proceeds and the CPU 13 selects the third channel (CH3) as the channel to be adjusted in S160 and executes the adjustment process in S370.

When the adjustment process is started, the CPU 13 determines through the AFE control unit 21 whether or not the offset voltage set at the offset adjustment circuit 46 of the third channel (CH3) is appropriate (S411).

When the CPU 13 determines that the offset voltage is not appropriate ("No" in S411), it changes the set offset value of the third channel (CH8) stored in the offset register 57, and then determines again whether or not the offset voltage is appropriate in S411.

When it is determined that the offset voltage is appropriate ("Yes" in S411), the CPU 13 determines through the AFE control unit 21 whether or not the gain set at the amplifier 49 of the third channel (CH3) is appropriate.

If it is determined that the gain is not appropriate ("No" in S415), the CPU 13 changes through the AFE control unit 21 the set gain value of the third channel (CH3) stored in the gain register 58 in S417, and again determines whether or not the gain is appropriate in S415. When it is determined that the gain is appropriate ("Yes" in S415), the present adjustment process is terminated and the present change process is terminated at the same time.

During the adjustment process described above, determination is made based on the output signal from the ADC operation determination unit 61. It is of course possible, however, for the CPU 13 to directly determine the output of the analog/digital converter 9 through the APE control unit 21 and set the offset voltage and the gain to each appropriate value.

According to the image reading apparatus 1 of the present embodiment, which comprises the analog frontend IC 5 having three channels and provided internally with the amplifiers 47 to 49 for respective channels capable of adjusting the gain with respect to an analog input signal, the analog/digital converter 9 for converting the analog input signal into a digital signal and outputting the digital signal, and the multiplexer 7 for sequentially providing the signals amplified by the respective amplifiers 47 to 49 to the analog/digital converter 9, the pixel signals of the respective channels output from the CCD image sensor 3 are provided to the analog frontend IC 5 to be converted into pixel data.

As a result, the circuits required for converting the pixel signals output from the CCD image sensor 3 into pixel data may be down-sized, which increases options for installation locations of the circuits.

Also, the length of the wiring in the circuits may be reduced, which makes the image reading apparatus 1 more resistant to external noises. This advantage will be enhanced, particularly in the case of mounting the analog frontend IC 5 on the substrate of the CCD image sensor 3.

Furthermore, according to the present embodiment in which an existing analog frontend IC 5 can be used, the manufacturing cost of the image reading apparatus may be reduced.

According to the image reading apparatus 1 of the present embodiment, the common analog frontend IC 5 is provided for the color CCD image sensor 27 and the monochrome CCD image sensor 30. During the operation of the color CCD image sensor 27, pixel signals of respective colors output from the color CCD image sensor 27 are provided to the amplifiers 47 to 49 of the channels in the analog frontend IC 5 corresponding to the respective colors, instead of pixel signals output from the monochrome CCD image sensor 30. By this, the number of components can be reduced and the circuit configuration can be simplified, and thus the manufacturing cost of the image reading apparatus may be reduced.

According to the image reading apparatus 1 of the present embodiment, the change process, i.e. the offset adjustment and the gain adjustment of the respective amplifiers 47 to 49 in the analog frontend IC 5, is executed through the AFE control unit 21 during the respective operations of the monochrome CCD image sensor 30 and the color CCD image sensor 27. Therefore, the pixel signals from the monochrome CCD image sensor 30 and the color CCD image sensor 27, respectively, can be amplified appropriately. In other words, the output signals from the CCD image sensor 3 can be amplified taking full advantage of the performance of the analog frontend IC 6. Thus, the accuracy of image reading may be increased according to the image reading apparatus 1 of the present embodiment.

During the operation of the monochrome CCD image sensor 30, it is less advantageous to adjust the respective gains for the amplifiers 47 to 49 of the respective channels. Accordingly, in the image reading apparatus 1 of the present embodiment, once the gain for the amplifier 47 of the first channel has been adjusted in the change process through the AFE control unit 21, the adjusted gain is set at the amplifiers 48, 49 of the second channel and the third channel during the operation of the monochrome CCD image sensor 30. Thus, the gain adjustment during the operation of the monochrome CCD image sensor 30 can be performed rapidly according to the image reading apparatus 1 of the present embodiment. The same advantage due to the configuration of the apparatus as above may be attained also in the offset adjustment.

The test signal used for the offset adjustment and the gain adjustment may be a light reception signal which is transmitted first and is not a valid pixel element among the light reception signals from the CCD image sensor 3, although no detailed description about the test signal is provided concerning the present embodiment.

While the offset adjustment and the gain adjustment are performed through the AFE control unit 21 every time an image read command signal is input according to the present embodiment, it may be possible to previously store on the EEPROM 24 the respective initial set values of the offset voltage and the gain to be set during the operation of the monochrome CCD image sensor 30 and the operation of the color CCD image sensor 27 and selectively read the stored values according to the operation mode so that the offset voltage and the gain of the analog frontend IC 5 can be switched between those for monochrome reading and those for color reading.

Figure 8:
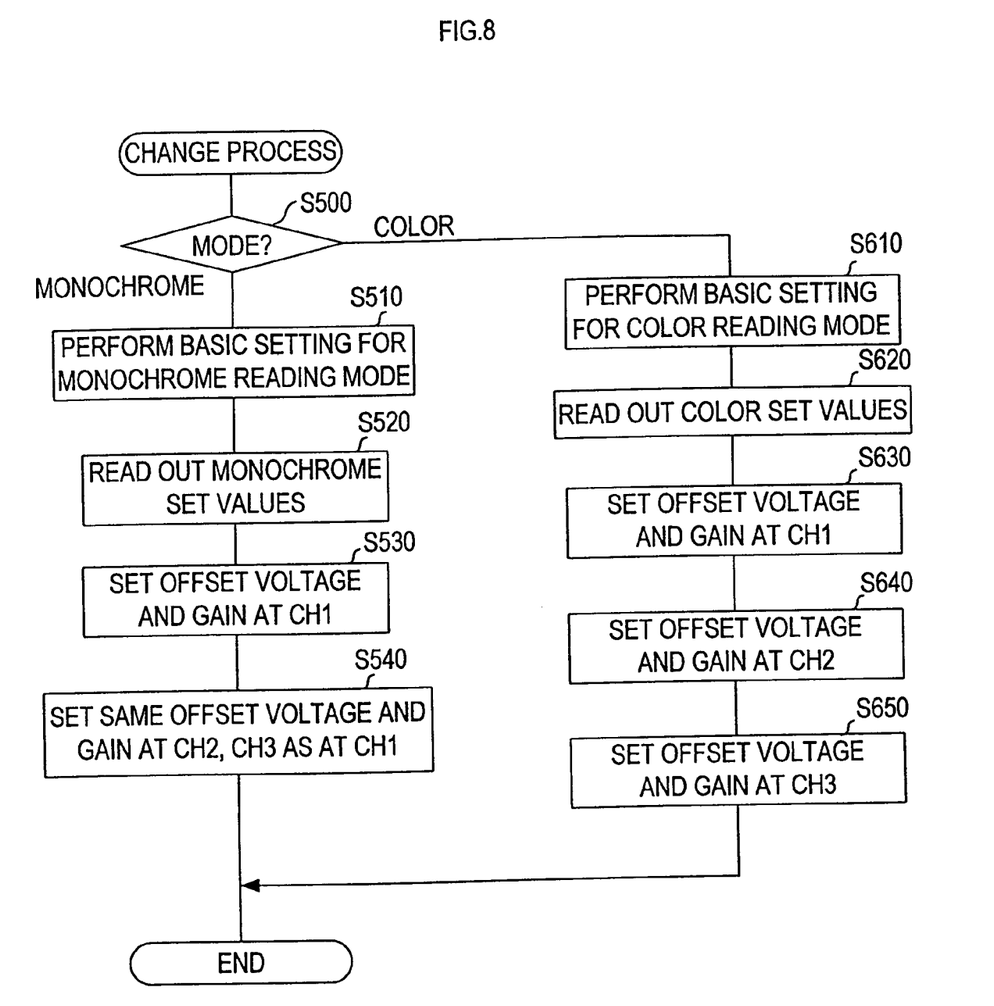
FIG. 8 is a flowchart showing the change process executed by the CPU through the AFE control unit according to a modified embodiment.
Figure 9:
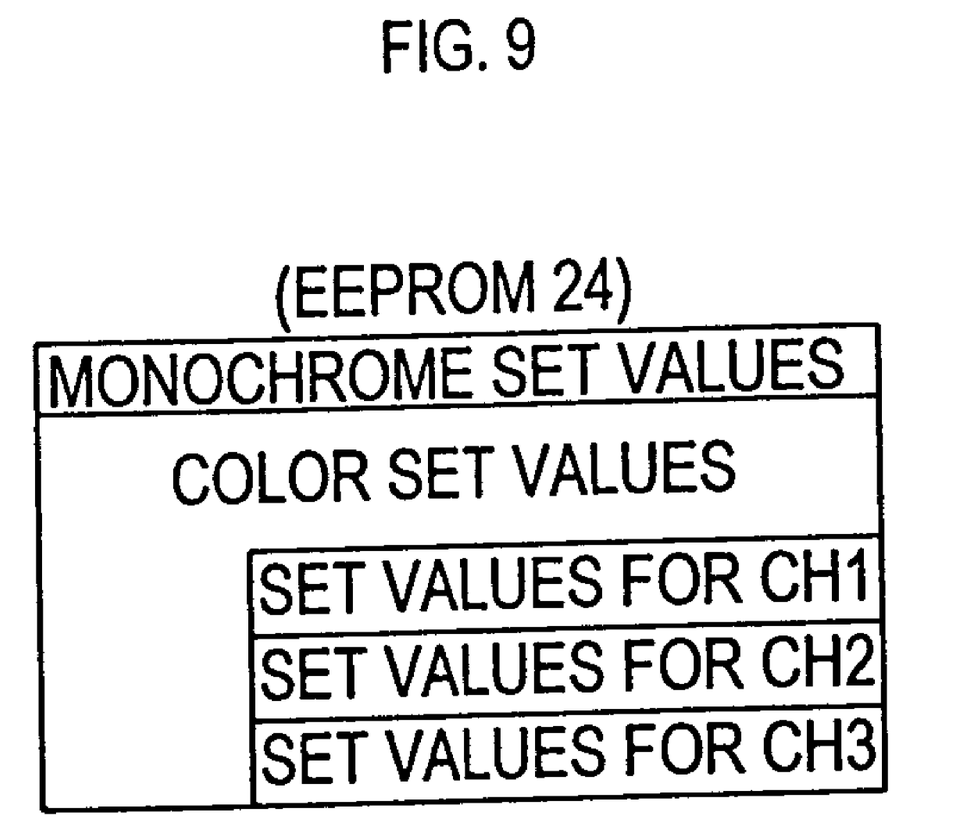
FIG. 9 is an explanatory view showing the configuration of data of set values stored on an EEPROM.

The change process according to the modified embodiment as above will now be described with reference to FIG. 8 and FIG. 9. FIG. 8 is a flowchart showing the change process according to the modified embodiment executed by the CPU 13 through the AFE control unit 21 when a read command signal is input. FIG. 9 is an explanatory view showing the configuration of data of the initial set values stored on the EEPROM 24. The following description is not about the features common with the above described embodiment but only about features characteristic to the modified embodiment.

On the EEPROM 24 of the image reading apparatus 1 according to the modified embodiment, predetermined set values for monochrome reading (hereinafter referred to as "monochrome set values") are stored as the initial set values of the offset voltage and the gain to be set during the operation of the monochrome CCD image sensor 30. On the EEPROM 24 of the image reading apparatus 1 according to the modified embodiment, predetermined set values for color reading (hereinafter referred to as "color set values") are also stored as the initial set values of the offset voltage and the gain to be set during the operation of the color CCD image sensor 27. The EEPROM 24 stores common set values for the offset adjustment circuits 44 to 46 and the amplifiers 47 to 49 of the respective channels as the above-mentioned monochrome set values. In contrast, the color set values include respective set values corresponding to the respective channels When the change process shown in FIG. 8 is started in response to the input of the read command signal, the CPU 13 first performs mode determination in accordance with the mode selection information transmitted with the read command signal in S500. When it is determined that the present read command is a read command in the monochrome reading mode, the process proceeds to S510. The CPU 13 performs basic setting for the monochrome reading mode in S510, and then reads out and obtains the monochrome set values stored on the EEPROM 24 in S520.

Subsequently, in S530, the CPU 18 changes the offset voltage of the offset adjustment circuit 44 and the gain of the amplifier 47 to the read-out monochrome set values by rewriting and changing the set offset value for the first channel (CH1) of the offset register 57 and the set gain value for the first channel (CH1) of the gain register 68 to the read-out monochrome set values through the AFE control unit 21.

Then, in S540, the CPU 13 changes the respective set offset values for the second channel (CH2) and the third channel (CH3) of the offset register 57 and the respective set gain values for the second channel (CH2) and the third channel (CH3) of the gain register 58 to the read-out monochrome set values through the AFE control unit 21. Thus, the offset voltages and the gains of all the channels are made common, and the present change process is terminated.

On the other hand, when it is determined in S500 that the present read command is a read command in the color reading mode, the process proceeds to S610. The CPU 13 performs basic setting for the color reading mode in S610, and then reads out and obtains the color set values stored on the EEPROM 24 in S620.

Subsequently, in S680, the CPU 13 changes the offset voltage of the offset adjustment circuit 44 and the gain of the amplifier 47 to the read-out color set values by rewriting and changing the set offset value for the first channel (CH1) of the offset register 57 and the set gain value for the first channel (CH1) of the gain register 68 to the set values for the first channel included in the read-out color set values through the AFE control unit 21.

In the same manner, in S640, the CPU 13 rewrites and changes the set offset value for the second channel (CH2) of the offset register 57 and the set gain value for the second channel (CH2) of the gain register 68 to the set values for the second channel included in the read-out color set values through the AFE control unit 21.

Further, in S650, the CPU 13 rewrites and changes the set offset value for the third channel (CH3) of the offset register 57 and the set gain value for the third channel (CH3) of the gain register 58 to the set values for the third channel included in the read-out color set values through the AFE control unit 21.

According to the image reading apparatus 1 of the modified embodiment, the CPU 13 sets the gains of the respective amplifiers 47 to 49 to a predetermined gain for monochrome reading during the operation of the monochrome CCD image sensor 80, while it sets the gains of the respective amplifiers 47 to 49 to predetermined gains for color reading during the operation of the color CCD image sensor 27 through the AFE control unit 21 in the change process. Therefore, the pixel signals from the respective CCD image sensors 27, 30 can be amplified appropriately in the analog frontend IC 5. Also, the offset voltage and the gain can be changed more rapidly than in the above described embodiment in which the gain adjustment is performed every time an image is read.

Although the present invention has been described in connection with the embodiments above, an image reading apparatus according to the present invention may have a various forms.

While the analog frontend IC 5 having the configuration in FIG. 5 is employed in the image reading apparatus 1 of the present embodiment, an analog frontend IC may have a variety of similar configurations. In other words, any analog frontend IC with a different configuration may be employed as long as it has at least three channels and also has an analog amplifier, an analog/digital converter and a multiplexer built-in.

What is claimed is:

1. An image reading apparatus that reads an image using a monochrome image sensor, comprising:
   the monochrome image sensor including:
      a first sensor having a plurality of light receiving elements arranged in a primary scanning direction,
      a second sensor having a plurality of light receiving elements which are arranged in the primary scanning direction and at a predetermined distance away from the first sensor in a secondary scanning direction and whose light receiving positions are set between the respective light receiving elements constituting the first sensor,
      a first shift register for outputting the respective light reception signals obtained from the respective light receiving elements constituting the first sensor according to the order of arrangement of the corresponding light receiving elements,
      a second shift register for outputting the respective light reception signals obtained from the respective light receiving elements arranged at even-numbered positions among the light receiving elements constituting the second sensor according to the order of arrangement of the corresponding light receiving elements, and a third shift register for outputting the respective light reception signals obtained from the respective light receiving elements arranged at odd-numbered positions among the light receiving elements constituting the second sensor according to the order of arrangement of the corresponding light receiving elements; and an analog frontend IC having at least three channels and provided internally with:

analog amplifiers for the respective channels capable of adjusting the gains with respect to analog input signals, an analog/digital converter for converting the analog input signals into digital signals and outputting the digital signals, and a multiplexer for sequentially providing the analog input signals amplified by the respective analog amplifiers to the analog/digital converter, wherein the respective light reception signals output from the first, the second and the third shift registers, respectively, are provided as the analog input signals to the analog amplifiers for the channels corresponding to the respective shift registers.

2. The image reading apparatus according to claim 1, further comprising a color image sensor capable of reading color images that outputs light reception signals in red, green and blue in addition to the monochrome image sensor, wherein during the operation of the color image sensor, the light reception signals in the respective colors output from the color image sensor, instead of the respective light reception signals output from the monochrome image sensors are provided as the analog input signals to the analog amplifiers for the channels corresponding to the respective colors in the analog frontend IC.

3. The image reading apparatus according to claim 2, further comprising a gain changing device for performing gain adjustment of the analog amplifiers during the respective operations of the monochrome image sensor and the color image sensor.

4. The image reading apparatus according to claim 3, wherein after performing gain adjustment to one of the analog amplifiers, the gain changing device sets the same gain at the other analog amplifiers during the operation of the monochrome image sensor.

5. The image reading apparatus according to claim 2, further comprising a gain changing device for setting the gains of the respective analog amplifiers to predetermined gains for monochrome reading during the operation of the monochrome image sensor, and for setting the gains of the respective analog amplifiers to predetermined gains for color reading during the operation of the color image sensor.

6. The image reading apparatus according to claim 5, wherein the gain changing device sets all the gains of the analog amplifiers to a predetermined common gain as the gains for monochrome reading during the operation of the monochrome image sensor.

7. The image reading apparatus according to claim 1, wherein the analog frontend IC includes correlated double sampling circuits for eliminating components that could cause noise and error from the pixel signals.

8. The image reading apparatus according to claim 1, wherein the analog frontend IC includes offset adjustment circuits for adding offset voltages to input signals of the respective channels.

9. The image reading apparatus according to claim 1, wherein the analog frontend IC includes an ADC operation determination unit for monitoring whether or not the output signals from the analog/digital converter are appropriate.

10. The image reading apparatus according to claim 1, wherein the analog frontend IC includes a register unit for storing set gain values indicating gains to be set at the respective amplifiers.

* * * * *